US012729157B2

(12) United States Patent
Liu

(10) Patent No.: US 12,729,157 B2
(45) Date of Patent: Sep. 8, 2026

(54) DEVICE FOR SMELTING AND REGENERATING PHOSPHOGYPSUM USING HIGH-TEMPERATURE CERAMSITE AND METHOD FOR USING SAME

(71) Applicant: HUBEI JUHAI ENVIRONMENTAL TECHNOLOGY CO., LTD, Wuhan (CN)

(72) Inventor: Zhihao Liu, Wuhan (CN)

(73) Assignee: HUBEI JUHAI ENVIRONMENTAL TECHNOLOGY CO., LTD., Wuhan (CN)

( * ) Notice: Subject to any disclaimer, the term of this patent is extended or adjusted under 35 U.S.C. 154(b) by 617 days.

(21) Appl. No.: 18/259,855

(22) PCT Filed: Dec. 28, 2021

(86) PCT No.: PCT/CN2021/142164
§ 371 (c)(1),
(2) Date: Jun. 29, 2023

(87) PCT Pub. No.: WO2022/143691
PCT Pub. Date: Jul. 7, 2022

(65) Prior Publication Data
US 2024/0383805 A1 Nov. 21, 2024

(30) Foreign Application Priority Data
Dec. 31, 2020 (CN) ........................ 202011625305.3

(51) Int. Cl.
*C04B 11/028* (2006.01)
*C04B 11/26* (2006.01)
(Continued)

(52) U.S. Cl.
CPC ...... *C04B 11/0285* (2013.01); *C04B 11/0286* (2013.01); *C04B 11/26* (2013.01);
(Continued)

(58) Field of Classification Search
CPC .......... F27B 7/16; F27B 7/26; C04B 11/0285; C04B 11/0286; C04B 11/26
(Continued)

(56) References Cited

U.S. PATENT DOCUMENTS 3,201,100 A * 8/1965 Dussossoy ................ F27B 7/16 432/118
5,746,006 A * 5/1998 Duske .................. F26B 17/106 34/136
(Continued)

FOREIGN PATENT DOCUMENTS

CN 112624642 A * 4/2021 ............ F27D 17/20
EP 4273108 A1 * 11/2023 ............ F27D 17/20
(Continued)

*Primary Examiner* — Stephen M Gravini
(74) *Attorney, Agent, or Firm* — Hemisphere Law, PLLC

(57) ABSTRACT

The present invention provides a device for smelting and regenerating phosphogypsum using high-temperature ceramsite and method for using same, where a rotary kiln is used to accept high-temperature ceramic granules that have been calcined and formed. The residual heat of the high-temperature ceramic granules allows them to be fully mixed with the phosphogypsum. On one hand, the high temperature of the ceramic granules achieves high-temperature dehydration of the phosphogypsum. On the other hand, the porous adsorption property of the ceramic granules can facilitate full absorption of some harmful substances in the phosphogypsum, thereby realizing the purification of the phosphogypsum. In addition, because the dehydrated phosphogypsum is generally in a suspended state, the rotary kiln of the present invention is equipped with a discharge outlet at the end. The discharge outlet uses a combination of a cyclone dust aspirator and a baghouse dust collector, which can draw out the phosphogypsum that has been fully dehydrated and is suspended in the rotary kiln, thereby realizing its complete collection without any leakage and achieving zero pollution.

9 Claims, 4 Drawing Sheets

(51) Int. Cl.
*F27B 7/16* (2006.01)
*F27B 7/26* (2006.01)
*F27D 17/25* (2025.01)

(52) U.S. Cl.
CPC .................. *F27B 7/16* (2013.01); *F27B 7/26* (2013.01); *F27D 17/25* (2025.01)

(58) Field of Classification Search
USPC ............................................................ 34/499
See application file for complete search history.

(56) References Cited

U.S. PATENT DOCUMENTS

| | | | | |
|---|---|---|---|---|
| 6,141,888 | A * | 11/2000 | Cammarata | F26B 25/225<br>34/202 |
| 6,168,426 | B1 * | 1/2001 | Yamada | F27D 9/00<br>219/390 |
| 7,201,572 | B2 * | 4/2007 | Wood | C04B 35/632<br>428/210 |
| 8,020,314 | B2 * | 9/2011 | George | H05B 6/78<br>264/432 |
| 9,221,027 | B2 * | 12/2015 | Kuppler | B01J 10/005 |
| 11,384,980 | B2 * | 7/2022 | Triglia, Jr. | F26B 13/008 |
| 12,390,801 | B2 * | 8/2025 | Wing | F27D 5/0031 |
| 12,557,823 | B2 * | 2/2026 | Aliaslkhiabani | A23B 2/97 |
| 12,559,369 | B2 * | 2/2026 | Bamagain | C01B 3/40 |
| 2016/0045841 | A1 * | 2/2016 | Kaplan | C01B 17/027<br>429/49 |
| 2024/0383805 | A1 * | 11/2024 | Liu | F27D 17/20 |

FOREIGN PATENT DOCUMENTS

| | | | | |
|---|---|---|---|---|
| WO | WO-2014153570 A9 * | 8/2015 | | H02K 7/09 |
| WO | WO-2022143691 A1 * | 7/2022 | | F27D 17/20 |

* cited by examiner

DEVICE FOR SMELTING AND REGENERATING PHOSPHOGYPSUM USING HIGH-TEMPERATURE CERAMSITE AND METHOD FOR USING SAME

TECHNICAL FIELD

The present invention pertains to the field or technology of phosphogypsum dehydration equipment. More specifically, it relates to a device for smelting and regenerating phosphogypsum using high-temperature ceramsite and method for using same.

BACKGROUND

Phosphogypsum is a by-product of the production of phosphoric acid by the sulfuric acid process, where the phosphoric acid is then used to produce high-concentration compound phosphate fertilizer. About 85% of China's phosphoric acid production uses the dihydrate process, also known as the wet phosphoric acid process. The phosphogypsum slag produced as a by-product of the wet phosphoric acid process has a free water content of 10%-25% and comes in the form of a moist powder or filter cake. Its color is predominantly greyish-white, with a particle size of 10-600 μm, mainly within the range of 80-200 μm. Generally, every ton of phosphoric acid produced results in the generation of 5-7 tons of phosphogypsum. Currently, China has accumulated over 500 million tons of phosphogypsum, with another 50 million tons added every year. The main component of phosphogypsum is calcium sulfate dihydrate, which contains impurities like phosphates, sulfates, fluorides, and heavy metals such as manganese and cadmium. Due to technological limitations and the cost of resource utilization, China's integrated phosphogypsum resource utilization rate is only about 10%. It is mainly stored as solid waste in tailings storage facilities and designated dumps. Phosphogypsum, during long-term storage, is subject to the accelerating release of soluble phosphorus, fluoride, and heavy metal pollutants due to natural weather phenomena such as sunlight, wind, rain, and thunderstorms. Soluble phosphorus and other acidic wastes in phosphogypsum are soaked and leached out again with rainfall, causing serious damage to surrounding water quality, soil, and vegetation. Particularly in mining areas, as surface runoff enters downstream rivers, groundwater systems, and soil layers, the migration and accumulation of pollutants directly affect drinking water for residents, agricultural irrigation, plant growth, the development of the fishing industry, and food safety. These pollutants consequently affect human health and have become a major source of ecological environmental pollution.

There are several ways to utilize phosphogypsum, but research often exceeds actual application. The main ways are as follows:

Firstly, it can be used in the cement industry to replace natural gypsum or desulfurized gypsum as a cement retarder and to replace limestone for producing cement and co-producing sulfuric acid. The amount used as a cement retarder is limited. Although replacing limestone for producing cement and co-producing sulfuric acid could consume a large amount of phosphogypsum, the technology is not yet mature and the co-production of sulfuric acid requires substantial investment, so there is no substantial use.

Secondly, it can be used to produce chemical raw materials, such as replacing limestone to produce calcium oxide and co-producing sulfuric acid. However, the impurities in phosphogypsum affect the quality of the product, and the large investment in co-producing sulfuric acid together limits its use.

Thirdly, it can replace natural gypsum or desulfurized gypsum to produce gypsum building materials. First, burnt gypsum powder is produced, and additives and modifiers are added to produce various gypsum products, such as plastering gypsum, self-leveling gypsum, painting gypsum, gypsum mortar, various types of gypsum board, various gypsum blocks, and gypsum partitions. The market for gypsum building materials in China is large, so producing gypsum building materials is a primary avenue explored to increase the resource utilization rate of phosphogypsum.

The primary step in utilizing phosphogypsum to produce gypsum building materials is to calcine and dehydrate phosphogypsum to produce gypsum powder. Relevant experiments have shown that under laboratory conditions, the dehydration of phosphogypsum begins at around 130° C., causing a phase change, and ends at about 250° C.

In terms of equipment, the current methods for calcining and dehydrating phosphogypsum mainly include the use of frying pans, rotary kilns, fluidized bed furnaces, and grinding and calcination integrated equipment, which can also burn off some harmful impurities during the dehydration process. The most mature of these is the frying pan, which uses heat-conducting oil as the thermal medium, low-temperature slow-burning, and a calcination time of 0.5-2 hours. Its features are that the heat-conducting oil has a high heat capacity and stable temperature, resulting in relatively stable quality of the produced gypsum powder. The downside is the low production efficiency, with a conventional scale of only 100,000 tons per year.

The above-mentioned calcination and dehydration methods for phosphogypsum have difficulty in achieving large-scale operation, thereby limiting the industrial development of using phosphogypsum to produce gypsum building materials. The present invention aims to provide an advanced, green and energy-saving technical solution for the calcination and dehydration of phosphogypsum, which can also be scaled up.

SUMMARY

The present invention provides a device for smelting and regenerating phosphogypsum using high-temperature ceramsite and method for using same, to realize the organic integration of drying and crushing wet phosphogypsum slag, preheating and dehydrating dry phosphogypsum powder, and cooling calcined gypsum powder. It can also realize large-scale configuration, to solve the technical problems of high energy consumption in the existing dehydration of phosphogypsum and the fact that dehydrated phosphogypsum is extremely likely to cause environmental pollution.

According to one aspect of the present invention, a device for smelting and regenerating phosphogypsum using high-temperature ceramsite is provided, including a rotary kiln, a cyclone dust aspirator, and a baghouse dust collector, where the rotary kiln is equipped with a feed inlet for input of phosphogypsum and ceramic granules, the rotary kiln is arranged in a tilted position, and a driving wheel is provided outside the rotary kiln, where the driving wheel is connected to a motor to drive rotation of the rotary kiln, the inner cylindrical surface of the rotary kiln is equipped with a stirring scraper, the stirring scraper being evenly arranged spirally on the inner cylindrical surface of the rotary kiln, the rotary kiln is in communication with the cyclone dust aspirator through a conveying pipe, and a tail end of the cyclone dust aspirator is in communication with the baghouse dust collector.

On the basis of the above solution, preferably, the stirring scraper includes a connecting arm connected to the inner cylindrical surface of the rotary kiln and a crushing plate, an even number of such connecting arms are provided, the connecting arms being arranged at central symmetry, the cross-section of the connecting arm is arc-shaped and tangent to the inner cylindrical surface of the rotary kiln, and the crushing plate is installed at the end of the connecting arm.

On the basis of the above solution, preferably, the stirring scraper is S-shaped, dividing the rotary kiln into two containment chambers, the stirring scraper is of a mesh structure, and the stirring scrapers are evenly spaced along a length direction of the rotary kiln.

On the basis of the above solution, preferably, adjacent ones of the stirring scrapers are arranged at 180-degree symmetry.

On the basis of the above solution, preferably, the middle of the stirring scraper at the feed inlet is equipped with protrusions for crushing phosphogypsum, where the protrusions are provided in plurality and evenly distributed on two sides of the stirring scraper.

On the basis of the above solution, preferably, the baghouse dust collector includes an outer shell, an inner shell, and bags, the inner shell is installed inside the outer shell to form a cavity, and the inner shell is provided with a plurality of installation holes, and the bags are installed on the installation holes.

On the basis of the above solution, preferably, the rotary kiln further includes a feeding section and a mixing section, the feeding section is in communication with the mixing section, the feed inlet is arranged in the feeding section, the feeding section includes a kiln body and a mixing tank, an end of the mixing tank extends outward to form a rod body, the rod body is installed on the kiln body through a first support seat and a second support seat, and a compression spring is installed at an end of the rod body, where the compression spring is covered with a gear, the gear is externally connected to a driving gear, and a telescopic rod of a driving cylinder is connected to the rod body.

On the basis of the above solution, preferably, the diameter of the mixing tank tapers towards the end.

The present invention also provides a method for pollution-free dehydration of phosphogypsum using residual heat of ceramic granules, where the apparatus as described above is used, the method including the following steps:

- step A1, introducing water-containing phosphogypsum and high-temperature ceramic granules into the rotary kiln through the feed inlet, and controlling rotation of the rotary kiln to make the water-containing phosphogypsum and high-temperature ceramic granules in the kiln body fully mixed and in contact; and
- step A2, starting the baghouse dust collector to collect by negative pressure extraction dehydrated phosphogypsum that is in a suspended state.

The device for smelting and regenerating phosphogypsum using high-temperature ceramsite and method for using same in the present invention involve the use of a rotary kiln to accept high-temperature ceramic granules that have been calcined and formed. The residual heat of the high-temperature ceramic granules allows them to be fully mixed with the phosphogypsum. On one hand, the high temperature of the ceramic granules achieves high-temperature dehydration of the phosphogypsum. On the other hand, the porous adsorption property of the ceramic granules facilitates full absorption of some harmful substances in the phosphogypsum, thereby realizing the purification of the phosphogypsum. In addition, because the dehydrated phosphogypsum is generally in a suspended state, the rotary kiln of the present invention is equipped with a discharge outlet at the end. The discharge outlet uses a combination of a cyclone dust aspirator and a baghouse dust collector, which can draw out the phosphogypsum that has been fully dehydrated and is suspended in the rotary kiln, thereby realizing its complete collection without any leakage and achieving zero pollution.

DESCRIPTION OF EMBODIMENTS

The specific implementations of the present invention will be further detailed with reference to the accompanying drawings and embodiments. The following embodiments are used to illustrate the present invention, but not to limit the scope of the present invention.

Figure 1:
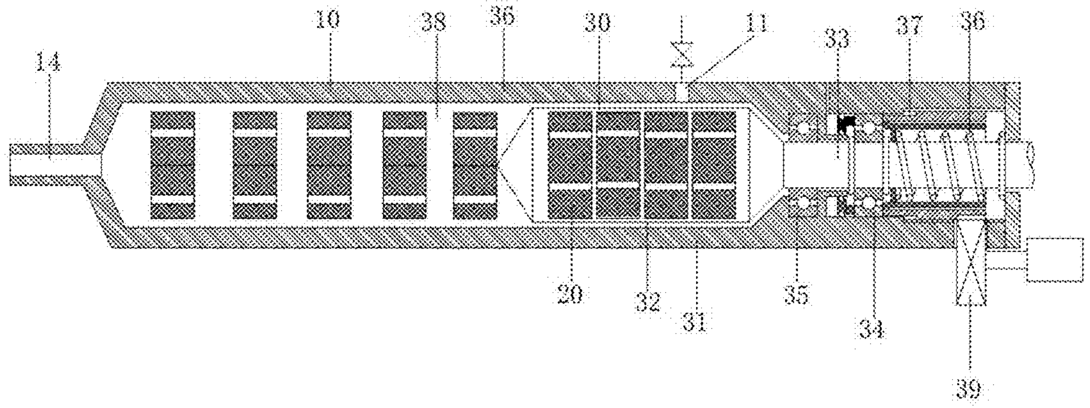
FIG. 1 is a structural diagram of a device for smelting and regenerating phosphogypsum using high-temperature ceramsite according to the present invention.

Refer to FIG. 1. A device for smelting and regenerating phosphogypsum using high-temperature ceramsite according to the present invention includes a rotary kiln 10, a cyclone dust aspirator, and a baghouse dust collector, where the rotary kiln 10 is equipped with a feed inlet 11 for input of phosphogypsum and ceramic granules, the rotary kiln 10 is arranged in a tilted position, and a driving wheel is provided outside the rotary kiln 10. The driving wheel is connected to a motor to drive rotation of the rotary kiln 10. The inner cylindrical surface of the rotary kiln 10 is equipped with a stirring scraper 20, the stirring scraper 20 being evenly arranged spirally on the inner cylindrical surface of the rotary kiln 10. The rotary kiln 10 is in communication with the cyclone dust aspirator through a conveying pipe, and a tail end of the cyclone dust aspirator is in communication with the baghouse dust collector.

During use, ceramic granules that have just been sintered are conveyed to the feed inlet 11 via a high-temperature resistant conveyor, and the phosphogypsum to be dehydrated is poured into the rotary kiln 10 through the feed inlet 11 at the top of the rotary kiln 10. The motor drives the driving wheel to rotate, causing the rotary kiln 10 to rotate rapidly, driving the high-temperature ceramic granules and phosphogypsum to rotate within the rotary kiln 10. The stirring scraper 20 inside the rotary kiln 10 fully mixes the high-temperature ceramic granules and phosphogypsum while transporting them to the end. When phosphogypsum comes into contact with the high-temperature ceramic granules, the heat of the high-temperature ceramic granules can evaporate water in the phosphogypsum. After the phosphogypsum is partially dehydrated, the size of its particles will decrease. At this time, the porosity of the ceramic granules can be utilized. The phosphogypsum seeps into the ceramic granules, undergoing a second round of contact dehydration.

This can not only evaporate the water in the phosphogypsum, but also take advantage of the porosity of the ceramic granules to seal and store part of the harmful substances within the phosphogypsum via the ceramic granules.

When the moisture content of the phosphogypsum drops below 15%, the phosphogypsum tends to become suspended, making it extremely volatile and thus leading to environmental pollution. To address this issue, the rotary kiln 10 of the present invention is designed to be sealed overall. During operation, external air is introduced through the feed inlet 11, and an exhaust outlet is created at the discharge end, which is connected to the cyclone dust aspirator. This set-up allows the evaporated phosphogypsum to be recovered under negative pressure through the cyclone dust aspirator, ensuring its dehydration and recovery without any pollution.

It is worth noting that to avoid the issue of the input phosphogypsum particles being too large and therefore taking a long time to dehydrate, in the present invention, a crushing plate 22 can be installed at the middle part of the rotary kiln 10, corresponding to the feed inlet 11. When the phosphogypsum comes in, it first interacts with the crushing plate 22. The function of the crushing plate 22, combined with gravity, can break down the water-containing phosphogypsum, ensuring effective contact and mixture with the ceramic granules. To guarantee the effectiveness of the crushing process, the diameter of the rotary kiln 10 of the present invention is preferably greater than 2 m.

Figure 3:
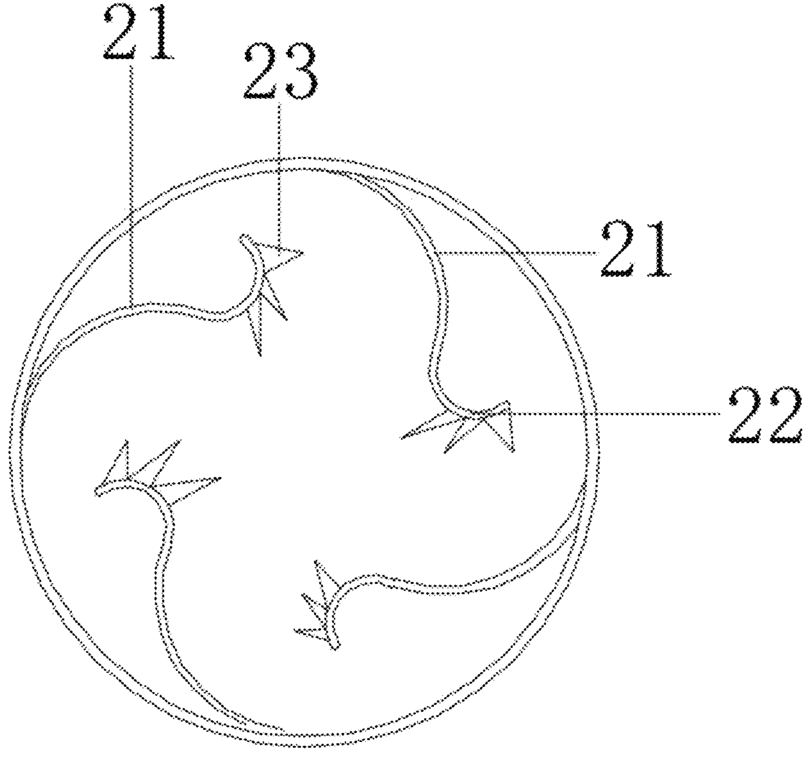
FIG. 3 is a second state diagram of the stirring scraper of the present invention.

As shown in FIG. 3, the stirring scraper 20 of the present invention includes a connecting arm 21 connected to the inner cylindrical surface of the rotary kiln 10 and a crushing plate 22, an even number of such connecting arms are provided, the connecting arms 21 being arranged at central symmetry, the cross-section of the connecting arm 21 is arc-shaped and tangent to the inner cylindrical surface of the rotary kiln 10, and the crushing plate 22 is installed at the end of the connecting arm 21.

Figure 4:
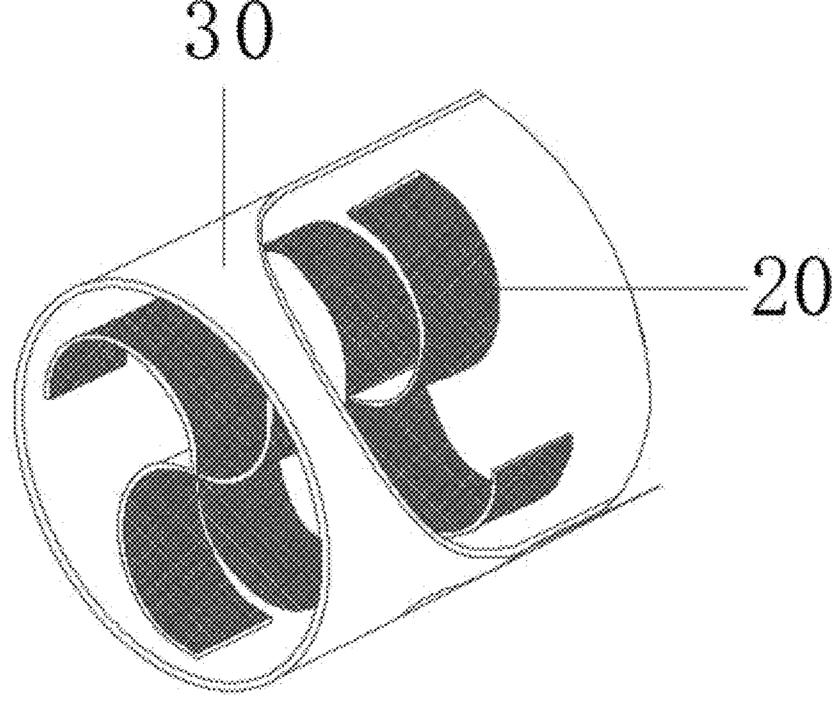
FIG. 4 is a third state diagram of the stirring scraper of the present invention.
Figure 5:
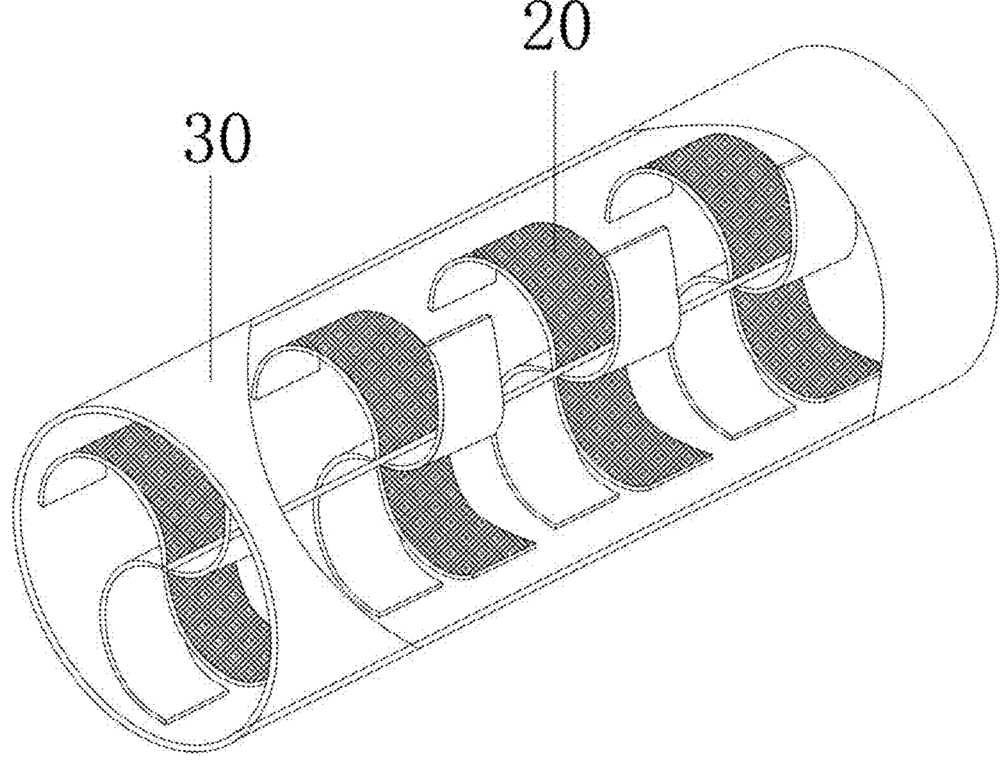
FIG. 5 is a three-dimensional view of the third state of the stirring scraper of the present invention from another angle.

As shown in FIG. 4 and FIG. 5, four stirring scrapers 20 are provided in the present invention. Extension lines of the connecting arms 21 meet at the center of the rotary kiln 10, forming a plum blossom shape overall. The crushing plate 22 is arc-shaped. The bottom of the crushing plate 22 is connected with the connecting arm 21, and the other end of the crushing plate 22 extends towards the root of the connecting arm 21, then bends and extends in a direction leaving the center of the connecting arm 21.

In use, when the ceramic granules and phosphogypsum rotate inside the rotary kiln 10, due to the relatively large diameter of the rotary kiln 10, larger phosphogypsum particles that have not been dehydrated will fall from high positions under the action of the stirring scrapers 20 during rotation. With the effect of the crushing plates 22, these particles can be rapidly cut, achieving the goal of crushing the phosphogypsum, while also increasing the contact area between the phosphogypsum and the ceramic granules.

In another preferred embodiment of the present invention, the stirring scraper 20 of the present invention is S-shaped, dividing the rotary kiln 10 into two containment chambers, the stirring scraper 20 is of a mesh structure, and the stirring scrapers 20 are evenly spaced along the length direction of the rotary kiln 10.

During operation, once the ceramic granules and the water-containing phosphogypsum of the present invention enter the apparatus, the stirring scraper 20 plays two roles. For one, it guides and transmits the phosphogypsum and ceramic granules. For the other, due to the structure of the stirring scraper 20, it can cut and break the phosphogypsum, while the ceramic granules can be transferred between the two chambers through the hollow center of the stirring scraper 20.

In another preferred embodiment of the present invention, adjacent ones of the stirring scrapers 20 of the present invention are arranged at 180-degree symmetry. In other words, during the operation process, the ceramic granules can enter one chamber from another chamber when moving from one end of the rotary kiln 10 to the other end of the rotary kiln 10, thereby achieving the purpose of exchange and improving the stirring and mixing effect.

Further, to prevent the issue of larger-sized phosphogypsum entering the apparatus, the present invention also provides protrusions 23 for crushing phosphogypsum in the middle of the stirring scraper 20 located at the feed inlet 11. A plurality of protrusions 23 are provided and evenly distributed on two sides of the stirring scraper 20. The end of the protrusion 23 is a sharp tip. When the phosphogypsum enters from the feed inlet 11 of the rotary kiln 10, the gravity will accelerate its impact on the sharp tips of the protrusions 23, thus achieving the purpose of crushing the phosphogypsum. The specific structure is shown in FIG. 3.

Figure 2:
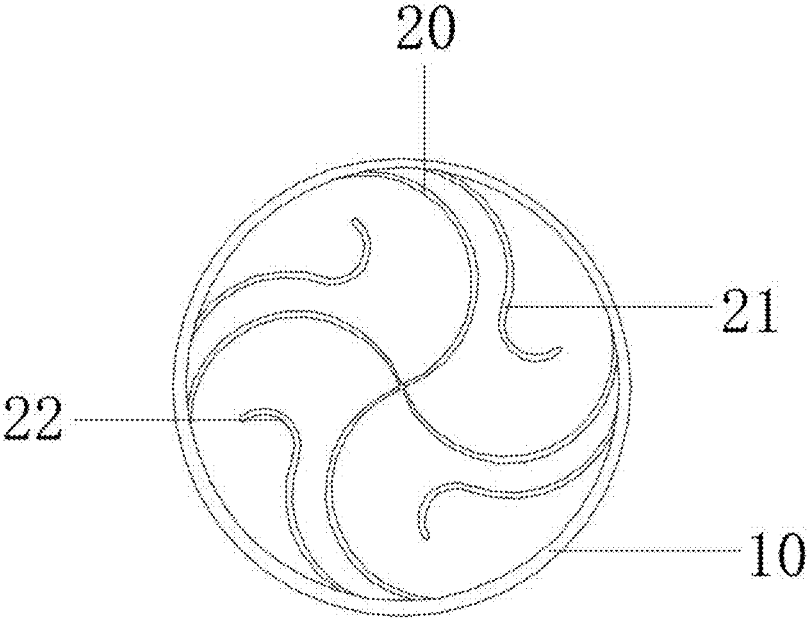
FIG. 2 is a first state diagram of a stirring scraper of the present invention.

It is worth noting that, in the present invention, a stirring scraper 20, consisting of a connecting arm 21 and a crushing plate 22, can be installed in one section of the rotary kiln 10, while an S-shaped stirring scraper 20 is set up in the adjacent end of the rotary kiln 10. The use of two different structures of stirring scrapers 20 can further effectively improve the overall mixing effect. The structure is shown in FIG. 2.

The baghouse dust collector includes an outer shell, an inner shell, and bags, the inner shell is installed inside the outer shell to form a cavity, and the inner shell is provided with a plurality of installation holes, and the bags are installed on the installation holes. In use, the cyclone dust aspirator generates negative pressure to quickly extract dehydrated phosphogypsum which is in a suspended state in the rotary kiln 10, and directs it into the inner shell. The bags on the installation holes of the inner shell can reduce the discharge speed of the phosphogypsum, thereby achieving the collection of phosphogypsum.

The rotary kiln 10 of the present invention further includes a feeding section 30 and a mixing section 38, the feeding section 30 is in communication with the mixing section 38 via a flexible pipeline, the feed inlet 11 is arranged in the feeding section 30, the feeding section 30 includes a kiln body 31 and a mixing tank 32, an end of the mixing tank 32 extends outward to form a rod body 33, the rod body 33 is installed on the kiln body 31 through a first support seat 34 and a second support seat 35, and a compression spring 36 is installed at an end of the rod body 33, where the compression spring 36 is covered with a gear 37, the gear 37 is externally connected to a driving gear 37, and the driving gear 37 is driven to move by a driving motor. A driving cylinder is installed at an end face of the rod body 33 and a telescopic rod of the driving cylinder is connected to the rod body 33. Preferably, the diameter of the mixing tank 32 tapers towards the end and a material guide plate is provided at the end of the mixing tank 32, where the material guiding plate is staggered with the stirring scraper 20 in the mixing section 38.

In use, the driving motor can be used to rotate the mixing tank 32 relative to the kiln body 31. The stirring scraper 20 is arranged inside the mixing tank 32. When the driving motor rotates the rod body 33, the phosphogypsum that enters the mixing tank 32 can be pre-mixed. This, combined with the contraction of the telescopic rod of the driving cylinder, forces the compression spring 36 to compress, thereby driving the mixing tank 32 to retract and shake in the length direction of the kiln body 31. In conjunction with the stirring scraper 20, this can further enhance the mixing and contact of high-temperature ceramic granules and phosphogypsum, thereby improving the overall mixing effect.

The present invention also provides a method for pollution-free dehydration of phosphogypsum using residual heat of ceramic granules, where the apparatus as described above is used. The method includes the following steps:

- step A1, introducing water-containing phosphogypsum and high-temperature ceramic granules into the rotary kiln 10 through the feed inlet 11, and controlling rotation of the rotary kiln 10 to make the water-containing phosphogypsum and high-temperature ceramic granules in the kiln body 31 fully mixed and in contact; and
- step A2, starting the baghouse dust collector to collect by negative pressure extraction dehydrated phosphogypsum that is in a suspended state.

The device for smelting and regenerating phosphogypsum using high-temperature ceramsite and method for using same in the present invention involve the use of a rotary kiln 10 to accept high-temperature ceramic granules that have been calcined and formed. The residual heat of the high-temperature ceramic granules allows them to be fully mixed with the phosphogypsum. On one hand, the high temperature of the ceramic granules achieves high-temperature dehydration of the phosphogypsum. On the other hand, the porous adsorption property of the ceramic granules facilitates full absorption of some harmful substances in the phosphogypsum, thereby realizing the purification of the phosphogypsum. In addition, because the dehydrated phosphogypsum is generally in a suspended state, the rotary kiln 10 of the present invention is equipped with a discharge outlet at the end. The discharge outlet uses a combination of a cyclone dust aspirator and a baghouse dust collector, which can draw out the phosphogypsum that has been fully dehydrated and is suspended in the rotary kiln 10, thereby realizing its complete collection without any leakage and achieving zero pollution.

Finally, although the method of the present invention has been described through preferable embodiments, these embodiments are not intended to limit the protection scope of the present invention. Any modifications, equivalent replacements, and improvements made without departing from the spirit and principle of the present invention shall fall within the protection scope of the present invention.

The invention claimed is:

1. A device for smelting and regenerating phosphogypsum using high-temperature ceramsite, comprising a rotary kiln, a cyclone dust aspirator, and a baghouse dust collector, wherein the rotary kiln is equipped with a feed inlet for input of phosphogypsum and ceramic granules, the rotary kiln is arranged in a tilted position, and a driving wheel is provided outside the rotary kiln, wherein the driving wheel is connected to a motor to drive rotation of the rotary kiln, an inner cylindrical surface of the rotary kiln is equipped with a stirring scraper, the stirring scraper is evenly arranged spirally on the inner cylindrical surface of the rotary kiln, the rotary kiln is in communication with the cyclone dust aspirator through a conveying pipe, and a tail end of the cyclone dust aspirator is in communication with the baghouse dust collector.

2. The device for smelting and regenerating phosphogypsum using high-temperature ceramsite as claimed in claim 1, wherein the stirring scraper comprises a connecting arm connected to the inner cylindrical surface of the rotary kiln and a crushing plate, an even number of such connecting arms are provided, the connecting arms are arranged at central symmetry, a cross-section of the connecting arm is arc-shaped and tangent to the inner cylindrical surface of the rotary kiln, and the crushing plate is installed at an end of the connecting arm.

3. The device for smelting and regenerating phosphogypsum using high-temperature ceramsite as claimed in claim 1, wherein the stirring scraper is S-shaped, dividing the rotary kiln into two containment chambers, the stirring scraper is of a mesh structure, and the stirring scrapers are evenly spaced along a length direction of the rotary kiln.

4. The device for smelting and regenerating phosphogypsum using high-temperature ceramsite as claimed in claim 3, wherein adjacent ones of the stirring scrapers are arranged at 180-degree symmetry.

5. The device for smelting and regenerating phosphogypsum using high-temperature ceramsite as claimed in claim 2, wherein a middle of the stirring scraper at the feed inlet is equipped with protrusions for crushing phosphogypsum, and the protrusions are provided in plurality and evenly distributed on two sides of the stirring scraper.

6. The device for smelting and regenerating phosphogypsum using high-temperature ceramsite as claimed in claim 1, wherein the baghouse dust collector comprises an outer shell, an inner shell, and bags, the inner shell is installed inside the outer shell to form a cavity, and the inner shell is provided with a plurality of installation holes, and the bags are installed on the installation holes.

7. The device for smelting and regenerating phosphogypsum using high-temperature ceramsite as claimed in claim 1, wherein the rotary kiln further comprises a feeding section and a mixing section, the feeding section is in communication with the mixing section, the feed inlet is arranged in the feeding section, the feeding section comprises a kiln body and a mixing tank, an end of the mixing tank extends outward to form a rod body, the rod body is installed on the kiln body through a first support seat and a second support seat, and a compression spring is installed at an end of the rod body, wherein the compression spring is covered with a gear, the gear is externally connected to a driving gear, and a telescopic rod of a driving cylinder is connected to the rod body.

8. The device for smelting and regenerating phosphogypsum using high-temperature ceramsite as claimed in claim 7, wherein a diameter of the mixing tank tapers towards the end.

9. A method for pollution-free dehydration of phosphogypsum using residual heat of ceramic granules, wherein the device as claimed in claim 1 is used, the method comprises the following steps:

- step A1, introducing water-containing phosphogypsum and high-temperature ceramic granules into the rotary kiln through the feed inlet, and controlling rotation of the rotary kiln to make the water-containing phosphogypsum and high-temperature ceramic granules in the kiln body fully mixed and in contact; and
- step A2, starting the baghouse dust collector to collect by negative pressure extraction dehydrated phosphogypsum that is in a suspended state.

* * * * *